United States Patent
Bhogal et al.

(10) Patent No.: US 7,587,596 B2
(45) Date of Patent: *Sep. 8, 2009

(54) METHOD AND APPARATUS FOR UPDATING INFORMATION STORED IN MULTIPLE INFORMATION HANDLING SYSTEMS

(75) Inventors: Kulvir Singh Bhogal, Fort Worth, TX (US); Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 831 days.

This patent is subject to a terminal disclaimer.

(21) Appl. No.: 11/064,623

(22) Filed: Feb. 24, 2005

(65) Prior Publication Data

US 2006/0190626 A1    Aug. 24, 2006

(51) Int. Cl.
H04L 9/32 (2006.01)
(52) U.S. Cl. ..................................... 713/168; 713/150
(58) Field of Classification Search ................. 713/150, 713/168–170, 175; 726/2, 26, 27, 29, 30
See application file for complete search history.

(56) References Cited

U.S. PATENT DOCUMENTS

| | | | |
|---|---|---|---|
| 5,425,140 A | 6/1995 | Bloomfield et al. | |
| 5,559,948 A | 9/1996 | Bloomfield et al. | |
| 5,884,323 A * | 3/1999 | Hawkins et al. | 707/201 |
| 5,903,845 A | 5/1999 | Buhrmann et al. | |
| 5,982,370 A | 11/1999 | Kamper | |
| 6,189,026 B1 | 2/2001 | Birrell et al. | |
| 6,269,369 B1 | 7/2001 | Robertson | |
| 6,334,046 B1 | 12/2001 | Philipson et al. | |
| 6,349,299 B1 | 2/2002 | Spencer et al. | |
| 6,381,618 B1 | 4/2002 | Jones et al. | |
| 6,477,543 B1 * | 11/2002 | Huang et al. | 707/200 |
| 6,640,230 B1 | 10/2003 | Alexander et al. | |
| 6,661,436 B2 | 12/2003 | Barksdale et al. | |
| 6,678,741 B1 * | 1/2004 | Northcutt et al. | 709/248 |
| 6,684,336 B1 * | 1/2004 | Banks et al. | 709/227 |
| 6,687,362 B1 | 2/2004 | Lindquist et al. | |
| 6,694,336 B1 * | 2/2004 | Multer et al. | 707/201 |
| 6,697,942 B1 | 2/2004 | L'Heureux et al. | |
| 6,732,144 B1 * | 5/2004 | Kizu et al. | 709/203 |
| 6,765,597 B2 | 7/2004 | Barksdale et al. | |
| 6,768,997 B2 | 7/2004 | Schirmer et al. | |

(Continued)

OTHER PUBLICATIONS

ACTIONEER, "Actioneer Press Release—Actioneer and IBM ViaVoice Speech-Enable Lotus Notes R5", Dec. 7, 1998.

(Continued)

*Primary Examiner*—Kimyen Vu
*Assistant Examiner*—Darren Schwartz
(74) *Attorney, Agent, or Firm*—David A Mims; Mark P Kahler

(57) ABSTRACT

A networked system includes multiple information handling systems (IHSs) that store personal user information such as name and contact information. The networked system automatically updates personal user information when one IHS communicates with another IHS. A first IHS stores personal user information associated with a first IHS user. A second IHS also stores the first user's personal information. The first IHS sends a first user information update to the second IHS if the first IHS determines that the first user information on the second IHS is not current. A digital certificate accompanies the update to indicate the authenticity of the information update to the second IHS.

3 Claims, 4 Drawing Sheets

U.S. PATENT DOCUMENTS

| | | | |
|---|---|---|---|
| 6,778,192 | B2 | 8/2004 | Arbab et al. |
| 6,806,888 | B2 | 10/2004 | Bhogal et al. |
| 7,003,546 | B1* | 2/2006 | Cheah et al. ............... 709/200 |
| 7,062,656 | B2* | 6/2006 | Richards et al. ............ 713/185 |
| 7,184,988 | B1* | 2/2007 | Frankel et al. ................ 705/67 |
| 7,280,996 | B2* | 10/2007 | Hayakawa et al. ............. 707/1 |
| 2001/0049617 | A1 | 12/2001 | Berenson et al. |
| 2002/0065630 | A1 | 5/2002 | Dwyer et al. |
| 2002/0099777 | A1 | 7/2002 | Gupta et al. |
| 2002/0151326 | A1* | 10/2002 | Awada et al. ............... 455/556 |
| 2002/0194379 | A1 | 12/2002 | Bennett et al. |
| 2003/0014278 | A1 | 1/2003 | Park et al. |
| 2003/0060223 | A1 | 3/2003 | Takeda et al. |
| 2003/0079024 | A1 | 4/2003 | Hough et al. |
| 2003/0093480 | A1 | 5/2003 | Lagarde et al. |
| 2003/0120805 | A1* | 6/2003 | Couts et al. ................. 709/238 |
| 2003/0135659 | A1 | 7/2003 | Bellotti et al. |
| 2003/0149781 | A1* | 8/2003 | Yared et al. ................. 709/229 |
| 2003/0158864 | A1 | 8/2003 | Samn |
| 2004/0012538 | A1 | 1/2004 | Bhogal |
| 2004/0019912 | A1 | 1/2004 | Staack |
| 2004/0024846 | A1 | 2/2004 | Randall et al. |
| 2004/0044734 | A1* | 3/2004 | Beck .......................... 709/206 |
| 2004/0054885 | A1* | 3/2004 | Bartram et al. ............. 713/152 |
| 2004/0064696 | A1 | 4/2004 | Daigle et al. |
| 2004/0088648 | A1 | 5/2004 | Kangas et al. |
| 2004/0093317 | A1 | 5/2004 | Swan |
| 2004/0110543 | A1 | 6/2004 | Mikan |
| 2004/0117443 | A1 | 6/2004 | Barsness |
| 2004/0119756 | A1 | 6/2004 | Kumhyr et al. |
| 2004/0205175 | A1* | 10/2004 | Kammerer ................. 709/223 |
| 2004/0205543 | A1 | 10/2004 | Awada et al. |
| 2005/0124332 | A1* | 6/2005 | Clark et al. ................. 455/419 |

OTHER PUBLICATIONS

NYAMGONDALU, "Lotus Notes Calendar and Scheduling Explained-PART 1", Oct. 19, 2004.
NYAMGONDALU, "Lotus Notes Calendar and Scheduling Explained-PART 2", Oct. 25, 2004.
IBM Lotus, "About Notes R5", downloaded from www.lotus.com on Nov. 5, 2004.
ACL, downloaded from www.wlug.org on Oct. 10, 2004.
IBM, "IBM Community Tools User's Manual", Mar. 2003.
Callaghan, "IBM Releases IM Community Tools", Aug. 11, 2003.
Callaghan, "IM, Message Brokering United", e-Week, Aug. 18, 2003.
IMC, "vCard Overview", downloaded from www.imc.org on Nov. 24, 2004.
Versit "vCard—The Electronic Business Card, Version 2.1" Sep. 18, 1996.
Howes et al., "RFC 2425—A MIME Content-Type for Directory Information" Sep. 1998.
Dawson et al., "RFC 2426—vCard MIME Directory Profile" Sep. 1998.
VERSIT, "vCard: The Electronic Business Card, Ver. 2.1, A Versit Consortium White Paper", Jan. 2, 1997.

* cited by examiner

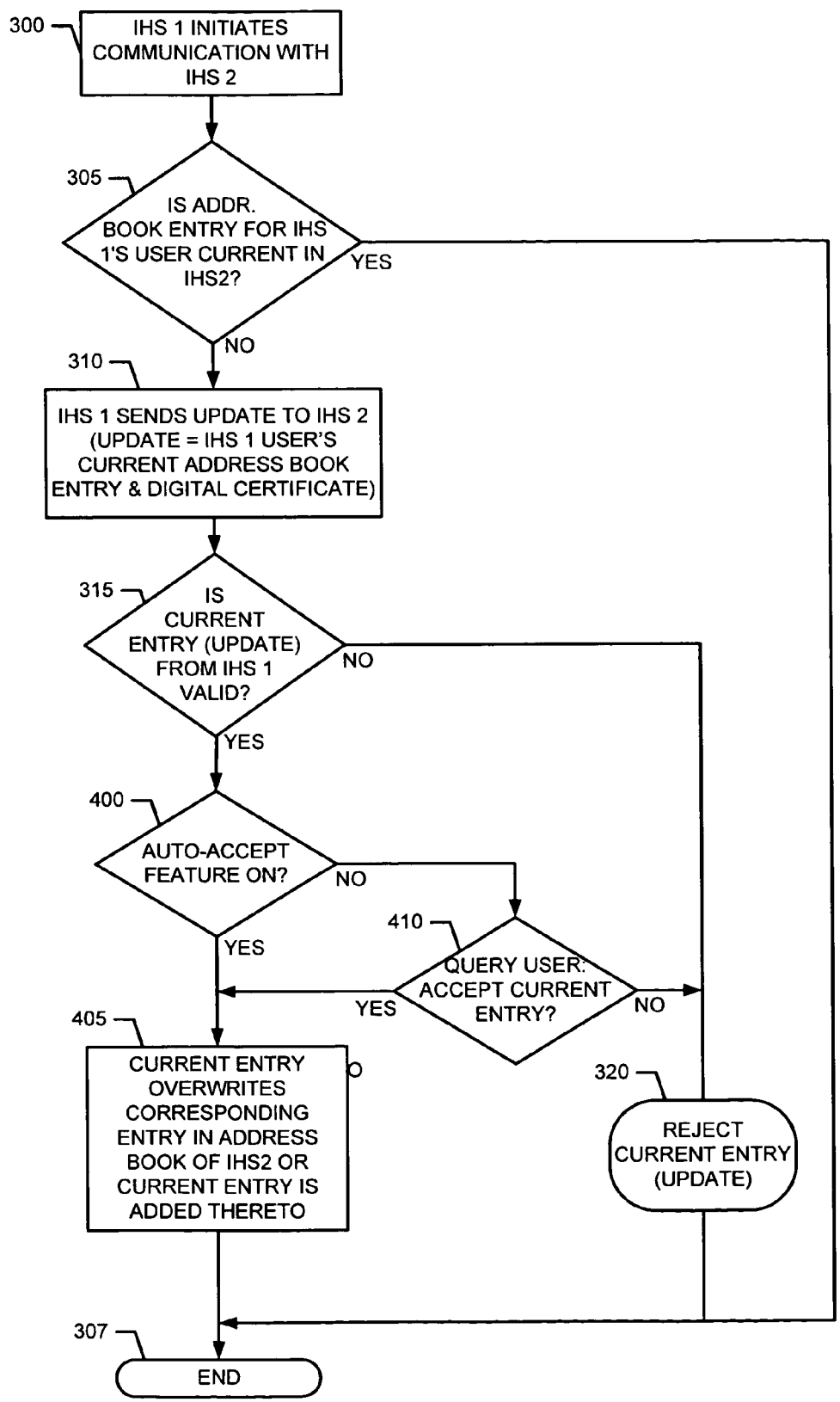

METHOD AND APPARATUS FOR UPDATING INFORMATION STORED IN MULTIPLE INFORMATION HANDLING SYSTEMS

CROSS REFERENCE TO RELATED PATENT APPLICATIONS

This patent application relates to the U.S. patent application entitled "Method and Apparatus For Task Scheduling In An Instant Messaging Environment", inventors Kulvir Singh Bhogal and Robert J. Kamper, application Ser. No. 11/064,646, filed Feb. 24, 2005, and assigned to the same assignee, the disclosure of which is incorporated herein by reference in its entirety.

This patent application relates to the U.S. patent application entitled "Method and Apparatus For Communicating Multiple Activity Availability Status In An Instant Messaging Environment", inventors Kulvir Singh Bhogal and Robert J. Kamper, application Ser. No. 11/064,598, filed Feb. 24, 2005, and assigned to the same assignee, the disclosure of which is incorporated herein by reference in its entirety.

This patent application relates to the U.S. patent application entitled "Method and Apparatus For Forwarding User Information Among Multiple Information Handling Systems", inventors Kulvir Singh Bhogal and Robert J. Kamper, application Ser. No. 11/064,622, filed Feb. 24, 2005, and assigned to the same assignee, the disclosure of which is incorporated herein by reference in its entirety.

This patent application relates to the U.S. Patent Application entitled "Method and Apparatus For Restricting Instant Messaging During A Scheduled Event", inventors Kulvir Singh Bhogal and Robert J. Kamper, (S.N. to be assigned, filed on the same day as the subject patent application, and assigned to the same assignee), the disclosure of which is incorporated herein by reference in its entirety.

TECHNICAL FIELD OF THE INVENTION

The disclosures herein relate generally to sharing information in information handling systems, and more particularly to updating personal user information stored in multiple information handling systems.

BACKGROUND

Networks of information handling systems (IHSs), such as computing devices, telephones, personal digital assistants, continue to grow and proliferate. These IHSs frequently store personal information such as the user's name, street address, phone number and email address, to make communication with other IHSs more convenient. One simple way to create an address book of personal user information is for the user of an IHS, namely a calling party, to manually input the user information of receiving parties in the calling party's IHS address book. However, a problem occurs since over time individual entries need updating when user information changes. Of course the user can manually update the address book in the user's IHS. However, manual updates take valuable time and errors may occur when updating manually.

Since manually updating the user's address book takes so much time and can result in user introduced error, systems for automatically updating user address books are very desirable. Conventional updating systems are known in which a central repository, such as a telephone exchange, maintains a database of up-to-date user address books for IHS users in that exchange. Each user's IHS can interrogate the central repository to obtain the up-to-date address of another user in that exchange.

Moreover, some conventional phone systems automatically update the address books of users who subscribe to this feature. In one such system, a subscriber's IHS locally stores the subscriber's address book in the subscriber's IHS. The phone system updates the subscriber's address book by automatically populating the address book entries stored on the subscriber's IHS. A telephone exchange maintains a central repository of address book information such as subscriber's name, street address, phone number and email address. When a call is initiated between a subscriber and another party in the exchange, the exchange confirms that the subscriber signed up for automatic updating and then transmits to the subscriber up-to-date address book information for the other party. The address book on the subscriber's IHS then updates itself with the up-to-date address book information received from the exchange.

Other conventional systems synchronize the complete address book of one IHS with the address book of another IHS, for example between a desktop IHS and a portable personal digital assistant (PDA) IHS. These systems can consume a significant amount of time checking all of the entries in the address book of one IHS to determine any differences with the entries of the address book of the other IHS. Moreover, these systems can consume even more time performing multiple updates required to synchronize one IHS with the other IHS.

What is needed is a method and apparatus for updating the address book of a user's IHS quickly without relying completely on a central exchange to provide a repository of up-to-date user address information.

SUMMARY

Accordingly, in one embodiment, a computer-implemented method is disclosed for updating electronic address books stored in a plurality of information handling systems (IHSs). The method includes storing, by a first IHS that is operable by a first user, first user address book information that is related to the first user. The method also includes storing, by a second IHS, the first user address book information, the second IHS being operable by a second user. The method further includes determining, by the first IHS, if the first user address book information stored in the second IHS is current with respect to the first user address book information stored in the first IHS. The method still further includes updating, by the first IHS, the second IHS with the first user address book information stored in the first IHS. This updating occurs in response to the first user address book information stored in the second IHS being determined to be not current by the first IHS.

In another embodiment, a networked system is disclosed that includes a first IHS that stores first user address book information. The first IHS is operable by a first user. The networked system also includes a second IHS that stores the first user address book information and second user address book information. The second IHS is operable by a second user. The networked system further includes a network infrastructure coupling the first and second IHSs together. The first IHS updates the second IHS with the first user address book information stored in the first IHS if the first IHS determines that the first user address book information stored in the second IHS is not current with respect to the first user address book information stored in the first IHS.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 4 shows a flow chart that depicts process flow in another embodiment of the disclosed IHS user information update methodology.

DETAILED DESCRIPTION

Figure 1:
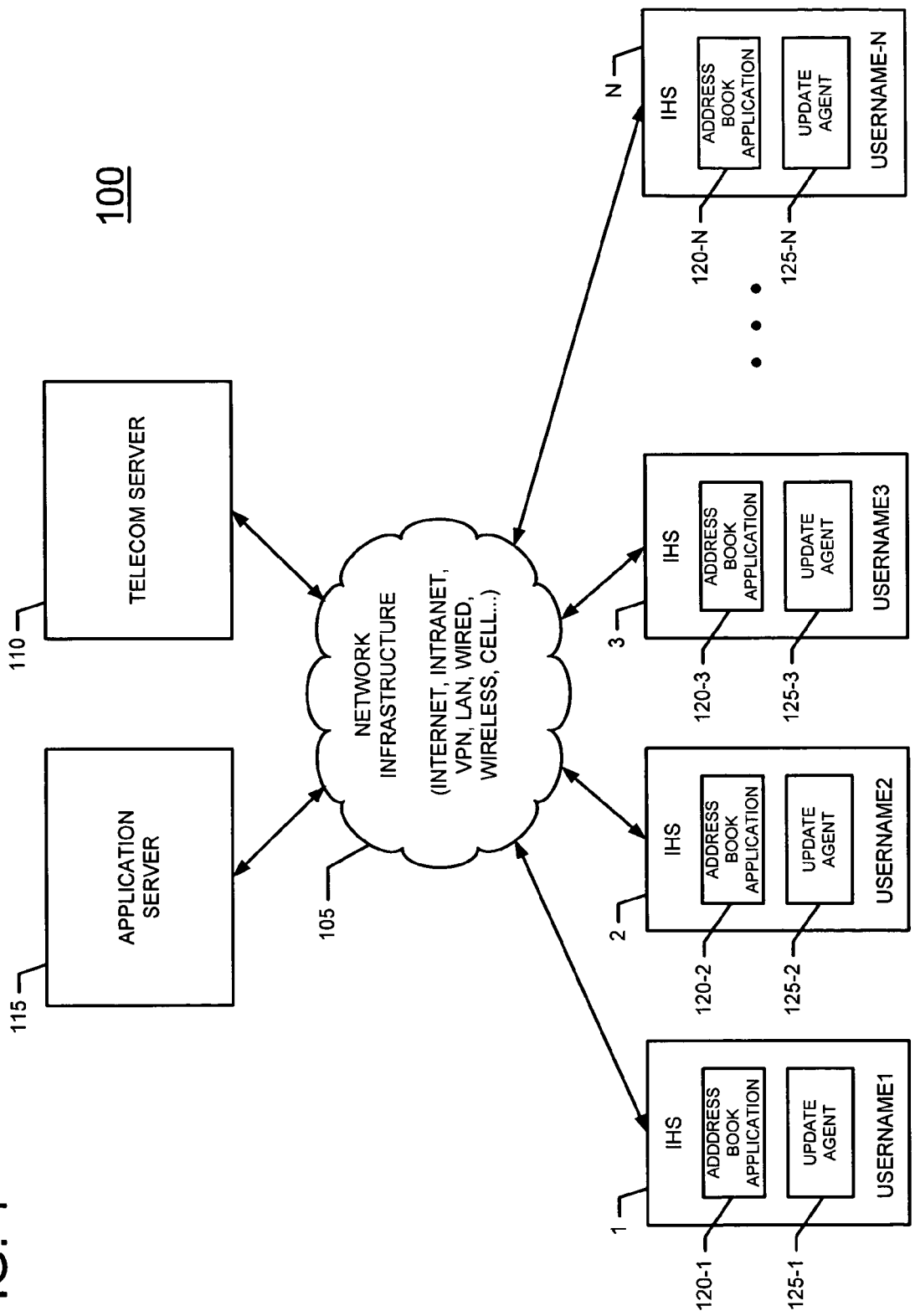
FIG. 1 shows a block diagram of one embodiment of a networked system using the disclosed user information update methodology.

FIG. 1 shows a block diagram of a representative networked system 100 that implements the disclosed technology. System 100 includes user information handling systems (IHSs) 1, 2, 3 . . . N wherein N defines the total number of IHSs in the system. User IHSs 1, 2, 3 . . . N include personal computer systems, laptops, notebooks, personal digital assistants, cell phones and other networkable devices that couple to one another to communicate information. In FIG. 1, network infrastructure 105 couples user IHSs 1, 2, 3 . . . N together via wire and/or wireless technology. Network infrastructure 105 may include networking structures such as the Internet, an intranet, a virtual private network (VPN), wire-based networking structures and wireless networking structures such as cellular communication devices. The user names USERNAME1, USERNAME2, USERNAME3 . . . USERNAME-N designate the names of the respective users of IHSs 1, 2, 3 . . . N. In one embodiment, system 100 includes a telecom server 110 that coordinates communication among user IHSs 1, 2, 3 . . . N. System 100 further includes an application server 115 that executes one or more server applications that IHSs 1, 2, 3 . . . N may access. In one embodiment, system 100 employs client devices as user IHSs 1, 2, 3 . . . N.

User IHSs 1, 2, 3 . . . N each include an address book application 120 and an update agent application 125. Address book application 120 stores user personal information in a plurality of entries, each entry corresponding to information regarding a respective IHS user, namely USERNAME1, USERNAME2, USERNAME3 . . . USERNAME-N. For example, each address book entry includes user address book information such as the name, street address, telephone number, e-mail address and other personal information regarding other users with whom a particular user communicates. In one embodiment, the address book entries employ a predefined format such as the well known vCard format to store information. (vCard is a trademark of the Internet Mail Consortium.) Other information formats that convey business card information and/or contact information are acceptable as well for these address book entries. Lotus Notes application software is an example of one address book application that may be employed as address book application 120. (Lotus Notes is a trademark of IBM Corporation.) Whatever the format selected, the address book entries convey address book information in electronic form, namely electronic address book information stored as digital data.

Figure 2:
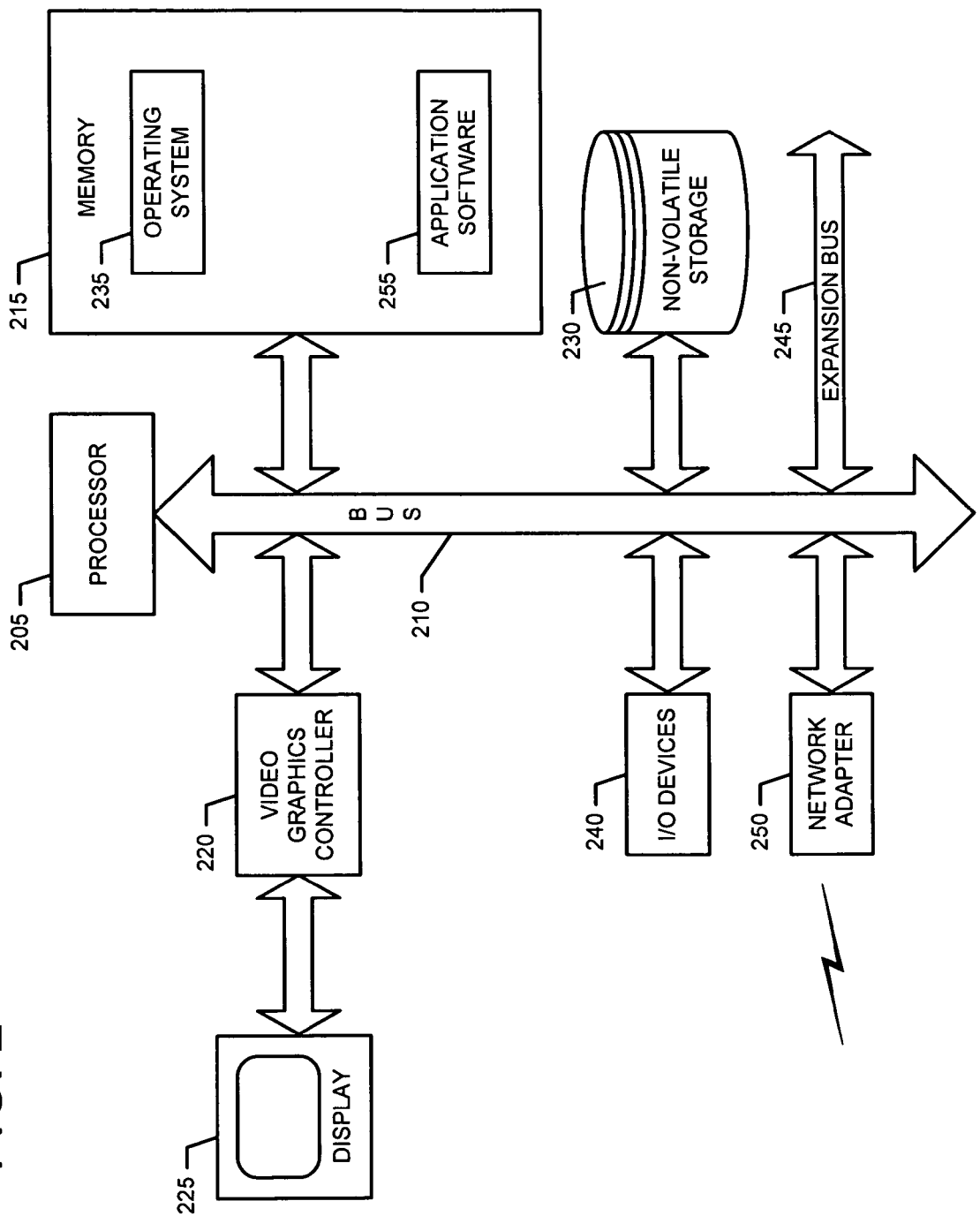
FIG. 2 shows a block diagram of a general purpose information handling system that can be used as clients and servers in the disclosed networked system.

FIG. 2 shows a general purpose information handling system (IHS) 200 that may be employed as IHSs 1, 2, 3 . . . N, application server 115 and telecom server 110. Information handling system (IHS) 200 includes a processor 205. Bus 210 couples processor 205 to system memory 215 and video graphics controller 220. A display 225 couples to video graphics controller 220. Nonvolatile storage 230, such as a hard disk drive, CD drive, DVD drive, or other nonvolatile storage couples to bus 210 to provide IHS 200 with permanent storage of information. An operating system 235 loads in memory 215 to govern the operation of IHS 200. I/O devices 240, such as a keyboard and a mouse pointing device, couple to bus 210. One or more expansion busses 245, such as USB, IEEE 1394, ATA, SATA, PCI, PCIE and other busses, couple to bus 210 to facilitate the connection of peripherals and devices to IHS 200. A network adapter 250 couples to bus 210 to enable IHS 200 to connect by wire or wirelessly to network infrastructures such as network infrastructure 105 shown in FIG. 1.

IHS 200 loads application software 255 from nonvolatile storage 230 to memory 215 for execution. The particular application software 255 loaded into memory 215 of IHS 200 determines the operational characteristics of IHS 200. IHS 200 is configurable as user IHS 1, 2, 3 . . . N, a telecom server 110 and as an application server 115. When IHS 200 acts as a user IHS such as IHS 1, IHS 200 loads address book application 120-1 and update agent 125-1 into system memory 215. Similarly, when IHS 200 acts as a telecom application server 110, IHS 200 loads telecom server application software into system memory 215. Likewise, when IHS 200 acts as application server 115, IHS 200 loads the desired application into system memory 215.

Returning to FIG. 1, IHSs 1, 2, 3 . . . N include respective update agents 125-1, 125-2, 125-3 . . . 125-N. System 100 employs software applications as update agents 125. Update agents 125 go into action when one user IHS communicates with another user IHS. For example, IHS 1 communicates with IHS 2 via network infrastructure 105. USERNAME1 operates IHS 1 and USERNAME2 operates IHS 2. When IHS 1 initiates communication with IHS 2, update agent 125-1 of IHS 1 checks the address book application 120-2 of IHS 2 to find any entry for USERNAME1 in IHS2. IHS 1's update agent 125-1 determines if the entry in IHS2 for USERNAME1 is up-to-date or current. If that entry is up-to-date, then update agent 125-1 takes no action to update IHS2. However, if update agent 125-1 of IHS 1 finds that the USERNAME1 entry in IHS 2 is not up-to-date, then update agent 125-1 of IHS 1 sends an up-to-date or current USERNAME1 entry to IHS2. USERNAME 2 of user IHS2 can accept or reject this up-to-date entry. If accepted, the update-to-date entry for USERNAME1 overwrites the corresponding previous entry for USERNAME1 in IHS2.

One alternative embodiment system of 100 includes an auto-accept feature. In the example above, when the user of IHS 2 enables or turns on the auto-accept feature, then IHS 2 automatically accepts the up-to-date entry from IHS 1 without further user intervention. In other words, IHS 2 does not ask USERNAME2 to accept or reject the updated entry from IHS 1. However, when USERNAME2 disables or turns the auto-accept feature off, then IHS 2 asks USERNAME2 to accept or reject the up-to-date entry from IHS 1 before storing the up-to-data entry in IHS 2.

In yet another embodiment, when IHS 1 and IHS 2 communicate, in addition to IHS 1 updating IHS 2 with USERNAME1 information, IHS 2 may also update IHS 1 with personal information from users of other IHSs such as IHS 3, for example. This scenario assumes that IHS 2 stores an entry for IHS 3's user, namely USERNAME3. More particularly, address book application 120-2 of IHS 2 stores an entry for USERNAME3. Update agent 125-2 of IHS 2 tests address book application 120-1 of IHS 1 to determine if IHS-1 stores an entry for USERNAME3. If IHS 1 stores an entry for USERNAME3, then update agent 125-2 of IHS 2 tests that entry to determine if it is current. If IHS 2 finds that the USERNAME3 entry stored in IHS 1 is current, then IHS 2 does not provide IHS 1 with an update of USERNAME3's entry or information. However, if IHS 2 finds that the USERNAME3 entry stored in IHS 1 is not current, then IHS 2 sends the current USERNAME3 entry from IHS 2 to IHS 1. IHS 1 then updates its entry for USERNAME 3 by storing the current USERNAME3 entry received from IHS2. In this example, before such information forwarding and sharing occurs, USERNAME 3 marks the USERNAME3 entry as sharable, non-private, by so indicating in address book application 120-3. This marking indicates to IHS 2 and other IHSs receiving the information from IHS 3, that the USERNAME3 information is sharable with other users. IHS 2 tests the USERNAME3 information for a sharable marking before forwarding the USERNAME3 information to other IHSs such as IHS 1. Without such a sharable marking, IHS 2 does not share the USERNAME3 information with other IHSs.

In still another embodiment, using address book application 120-1, USERNAME1 can mark his or her USERNAME1 entry as sharable with other users. When USERNAME1 so marks the USERNAME1 entry, this indicates to IHS 2 that IHS 2 can share this USERNAME1 entry with other IHSs, for example IHS 3. In the examples discussed above, a digital certificate of the owner of the address book entry accompanies the entry when one IHS user forwards the entry to another IHS user. In this manner, a recipient of the entry can test its authenticity.

Figure 3:
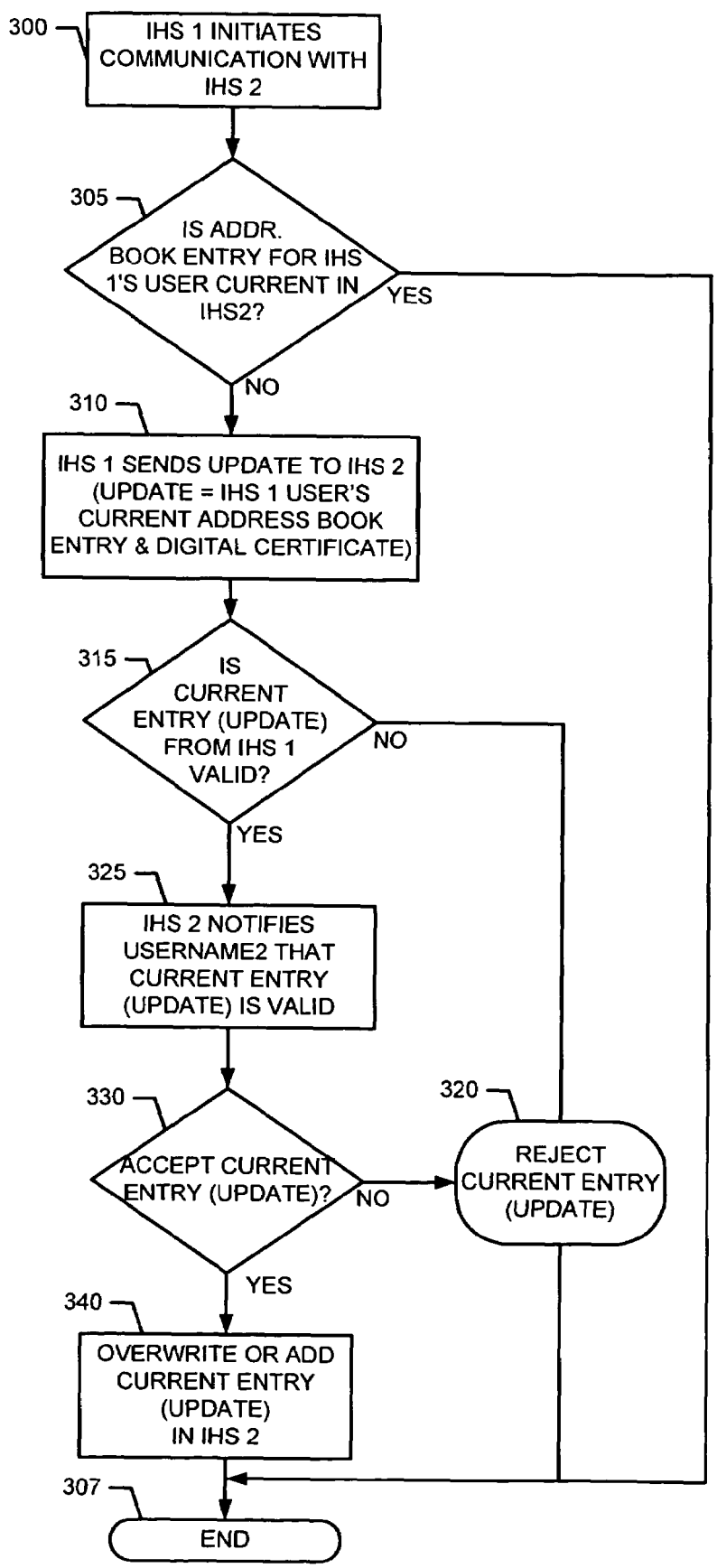
FIG. 3 shows a flow chart that depicts process flow in the disclosed IHS user information update methodology.

The flow chart of FIG. 3 depicts a process flow that update agents 125-1 and 125-2, in IHS 1 and IHS 2 respectively, employ in the disclosed personal information entry update process. In actual practice, software code in update agents 125-1 and 125-2 carries out the process depicted in this flow chart. Update agents 125-1 and 125-2 interact with address book applications 120-1 and 120-2 as now described. In this example, IHS 1 initiates communication with IHS 2 as per block 300. Address book application 120-1 in IHS 1 stores the current address book entry, i.e. the up-to-date address book entry, for USERNAME1 of IHS1. Since USERNAME 1 controls IHS 1, system 100 defines the address book entry for USERNAME 1 in address book application 120-1 as the current or up-to-date entry for that particular user. Update agent 125-1 of IHS 1 interrogates address book application 120-2 of IHS 2 to determine if the address book entry for USERNAME1 in IHS2 is current, i.e. up-to-date. In one embodiment, update agent 125-1 performs this determination by comparing the current address book entry of USERNAME1 in IHS1 with a corresponding address book entry for USERNAME1 retrieved from IHS2. If update agent 125-1 determines that the address book entry for IHS 1's USERNAME1 in IHS 2 is already up-to-date or current, i.e. that entry in IHS 2 compares identically with the address book entry for USERNAME1 in IHS 1, then no updating results. In this event, process flow continues to end block 307 and IHS1 continues with other processing activities. However, if update agent 125-1 determines that the address book entry for IHS 1's USERNAME1 in IHS 2 is not current, then update agent 125-1 in IHS 1 sends an update to IHS2 as per block 310. More specifically, update agent 125-1 in IHS 1 sends the current address book entry for USERNAME1 as an update along with a digital certificate to IHS 2.

The digital certificate referenced in block 310 identifies the current address book entry from IHS 1 as being authentic, namely that this entry originates from USERNAME1. This document also refers to the current address book entry from IHS 1 for USERNAME1 as the current entry or the update entry. In decision block 315, update agent 125-2 in IHS 2 tests to determine the authenticity of the current address book entry received from IHS 1, namely the update entry or current entry. More particularly, decision block 315 tests the digital certificate that accompanies the current entry received from IHS 1 to determine the current entry's authenticity. If decision block 315 determines that the current entry from IHS 1 is not authentic, then update agent 125-2 in IHS 2 rejects that entry as per block 320. Process flow then continues to end block 307 and IHS2 continues with other processing activities. However, if update agent 125-2 determines that the current entry from IHS 1 is authentic, then IHS 2 notifies USERNAME2 that the entry is valid as per block 325. In one embodiment, IHS 2 performs this notification visually on a display or orally via a loudspeaker. IHS 2 then asks USERNAME2 to decide whether or not to update address book application 120-2 with the current entry from IHS 1. If at decision block 330, USERNAME2 decides to reject the current entry received from IHS 1, then update agent 125-2 rejects the current entry as per block 320 and does not update address book application 120-2. Process flow then continues to end block 307 and IHS2 continues with other processing activities. However, if USERNAME2 decides at decision block 330 to accept the current entry as an update, then the current entry overwrites the corresponding old entry in IHS 2 as per block 340. Alternatively, USERNAME2 can decide to add the current entry to address book application 120-2 if overwriting the corresponding old entry is not desirable.

The flow chart of FIG. 4 depicts an alternative process flow that update agents 125-1 and 125-2 in IHS 1 and IHS 2 may employ in the disclosed personal information entry update methodology. Like numbers indicate like process blocks in the flow charts of FIG. 3 and FIG. 4. In the FIG. 4 flow chart, process flow continues the same as in blocks 300 through 320 of the FIG. 3 flow chart. In the FIG. 3 flow chart, the user of IHS 2, namely USERNAME2, decides whether or not to accept a particular update entry. However, the FIG. 4 flow chart depicts an update entry auto-accept feature. In this methodology, the user of IHS 2 at some point in time decides whether or not to turn the auto-accept feature on. If the user turns the auto-accept feature on, this indicates that IHS 2 automatically accepts valid entry updates from other IHSs without further intervention by the user. When decision block 315 determines that a current entry, i.e. update entry, from another IHS is valid, then process flow continues to auto-accept feature decision block 400. At decision block 400, the update agent 125-2 of IHS 2 determines if the user turned the auto-accept feature on. If update agent 125-2 determines that the user turned the auto-accept feature on, then the current entry received from IHS 1 overwrites the corresponding entry in address book application 120-2 of IHS 2 as per block 405. Alternatively, IHS 2 adds the current entry to address book application 120-2 as per block 405. However, if decision block 400 determines that the user turned the auto-accept feature off, then decision block 410 queries the user to either accept or reject the current entry. If the user does not accept the current entry, then IHS 2 rejects the current entry as per block 320. However, if the user accepts the current entry, then process flow continues to block 405 where IHS 2 stores the current entry in address book application 120-2 as before. Other embodiments are possible wherein the user can turn on the auto-update feature for some users while turning it off for other users. For example, USERNAME2 instructs IHS 2 to automatically accept any update entries from USERNAME1. In contrast, USERNAME2 may also instruct IHS 2 to query USERNAME2 regarding the acceptance of any update entries from USERNAME3.

Those skilled in the art will appreciate that the methodologies disclosed, such as seen in the flow charts of FIG. 4 and FIG. 5, can be implemented in hardware or software. Moreover, the methodologies represented in FIG. 4 and FIG. 5 may be embodied in a computer program product, such as a media disk, media drive or other storage media, or may be divided among multiple computer program products. In the embodiments discussed above, network infrastructure 105 communicates address book entries from one IHS to another IHS via email.

In one embodiment, the disclosed methodology is implemented as a client application, namely a sets of instructions (program code) in a code module which may, for example, be resident in the system memory 215 of system 200 of FIG. 2. Until required by the particular system 200, the set of instructions or program code may be stored in another memory, for example, non-volatile storage 230 such as a hard disk drive, or in a removable memory such as an optical disk or floppy disk, or downloaded via the Internet or other computer network. Thus, the disclosed methodology may be implemented in a computer program product for use in a client information handling system such as IHS 1, 2, 3 . . . N. It is noted that in such a software embodiment, code which carries out the functions described in the flowcharts of FIG. 3 and FIG. 4, may be stored in RAM or system memory 215 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses a networked system including multiple IHSs connected to one another by a network infrastructure. The IHSs include address book applications that store user personal information such as contact information for the users of the IHSs. The IHSs also include update agents that provide an automatic update feature which updates old user personal information with current user personal information without substantial user intervention when one user's IHS initiates a call to another user's IHS.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A computer-implemented method of updating electronic address books stored in a plurality of information handling systems (IHSs), the method comprising:

storing, by a first memory of a first IHS that is operable by a first user, first user address book information that is related to the first user;

storing, by a second memory of a second IHS, the first user address book information, the second IHS being operable by a second user;

determining, by an update agent application in the first memory of the first IHS, if the first user address book information stored in the second memory of second IHS is current with respect to the first user address book information stored in the first memory of the first IHS;

in response to the first user address book information stored in the second memory of the second IHS being determined to be not current, updating by the update agent application in the first memory of the first IHS the second IHS with the first user address book information stored in the first memory of the first IHS, wherein the updating includes transmitting over a network, by the first IHS, current first user address book information to the second IHS, wherein the updating further includes transmitting, by the first IHS, a digital certificate with the current first user address book information to the second IHS;

checking, by the second IHS, the digital certificate to determine if the transmitted current first user address book information is valid;

rejecting, by the second IHS, the transmitted current first user address book information if the transmitted current first user address book information is invalid;

providing, by a display of the second IHS, an indication that the transmitted current first user address book information is valid;

querying via the display of the second IHS, by the second IHS, the second IHS user to accept or reject the valid transmitted current first user address book information, storing, by the second memory of the second IHS, third user address book information of a third IHS, the third user address book information including an indication of whether or not the third user address book information is sharable with other than the second user of the second IHS; and transmitting over the network, by the second IHS, the third user address book information to the first user address book application in the first IHS, if the second IHS determines that third user address book information stored in the first memory of the first IHS is not current and the second IHS also determines that the third user address book information in the second IHS indicates that the third user address information is sharable, thus forwarding third user address book information by the second IHS to the first IHS.

2. A networked system comprising:

a first IHS that stores first user address book information in a first memory of the first IHS, the first IHS being operable by a first user;

a second IHS that stores the first user address book information and second user address book information in a second memory of the second IHS, the second IHS being operable by a second user;

a third IHS that stores third user address book information in a third memory of the third IHS, the first memory of the first IHS and the second memory of the second IHS also storing the third user address book information; and a network infrastructure coupling the first, second and third IHSs together, wherein the first IHS includes an update agent that updates the second IHS with the first user address book information stored in the first memory of the first IHS if the first IHS determines that the first user address book information stored in the second memory of the second IHS is not current with respect to the first user address book information stored in first memory of the first IHS, the update agent of the first IHS being configured to transmit via the network the current first user address book information and a digital certificate to the second IHS;

wherein the second IHS is configured to check the digital certificate to determine if the transmitted current first user address book information is valid, the second IHS being configured to reject the transmitted current first user address book information if the transmitted current first user address book information is invalid, the second IHS being further configured to provide by a display of the second IHS an indication that the transmitted current first user address book information is valid, the second IHS being further configured to query via the display of the second IHS the second IHS user to accept or reject the valid transmitted current first user address book information the second IHS being further configured to store the third user address book information, the third user address book information including an indication of whether or not the third user address book information is sharable with other than the second user of the second IHS;

the second IHS being further configured to transmit over the network the third user address book information to the first user address book application in the first IHS, if the second IHS determines that third user address book information stored in the first memory of the first IHS is not current and the second IHS also determines that the third user address book information in the second IHS indicates that the third user address information is sharable, thus forwarding third user address book information by the second IHS to the first IHS.

3. A computer program product stored on a computer operable storage medium for updating user address book information, the computer program product comprising:

instructions that store, by a first memory of a first IHS, first user address book information that is related to a first user, the first IHS being operable by the first user;

instructions that store, by a second memory of a second IHS, the first user address book information, the second IHS being operable by a second user;

instructions in the first memory of the first IHS that determine if first user address book information stored in a second memory of the second IHS is current with respect to the first user address book information stored in the first memory of the first IHS;

instructions in the first memory of the first IHS that update the second IHS with the first user address book information stored in the first memory of the first IHS if the first user address book information stored in the second memory of the second IHS is determined to be not current with respect to the first user address book information stored in the first IHS, wherein the instructions that update the second IHS include instructions that transmit over a network, by the first IHS, current first user address book information to the second IHS, wherein the instructions that update the second IHS further include instructions that transmit over the network, by the first IHS, a digital certificate with current first user address book information to the second IHS;

instructions that check, by the second IHS, the digital certificate to determine if the transmitted current first user address book information is valid;

instructions that reject, by the second IHS, the transmitted current first user address book information if the transmitted current first user address book information is invalid;

instructions that provide to a display, by the second IHS, an indication that the transmitted current first user address book information is valid; and instructions that query via the display of the second IHS, by the second IHS, the second IHS user to accept or reject the valid transmitted current first user address book information;

instructions that store, by the second memory of the second IHS, third user address book information of a third IHS, the third user address book information including an indication of whether or not the third user address book information is sharable with other than the second user of the second IHS; and instructions that transmit over the network, by the second IHS, the third user address book information to the first IHS, if the second IHS determines that third user address book information stored in the first memory of the first IHS is not current and the second IHS also determines that the third user address book information in the second IHS indicates that the third user address information is sharable, thus forwarding third user address book information by the second IHS to the first IHS.

* * * * *

UNITED STATES PATENT AND TRADEMARK OFFICE
CERTIFICATE OF CORRECTION

PATENT NO. : 7,587,596 B2 Page 1 of 1
APPLICATION NO. : 11/064623
DATED : September 8, 2009
INVENTOR(S) : Bhogal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Twenty-first Day of September, 2010

David J. Kappos
*Director of the United States Patent and Trademark Office*